United States Patent [19]

Bonk et al.

[11] Patent Number: 4,563,388

[45] Date of Patent: Jan. 7, 1986

[54] POLYOLEFIN SUBSTRATE COATED WITH ACRYLIC-TYPE NORMALLY TACKY AND PRESSURE-SENSITIVE ADHESIVE AND A METHOD OF MAKING SAME

[75] Inventors: Thomas J. Bonk, Stillwater; J. Thomas Simpson, Lake Elmo, both of Minn.

[73] Assignee: Minnesota Mining and Manufacturing Company, St. Paul, Minn.

[21] Appl. No.: 583,896

[22] Filed: Feb. 27, 1984

Related U.S. Application Data

[63] Continuation-in-part of Ser. No. 479,517, Mar. 28, 1983, abandoned.

[51] Int. Cl.$^4$ ................................................ B32B 3/26
[52] U.S. Cl. .................................. 428/304.4; 428/40; 428/355; 525/240; 427/35; 427/54.1; 427/43.1; 427/44; 427/208.4; 427/208.8; 427/412.3
[58] Field of Search .................. 525/240; 428/355, 40, 428/317.1, 317.3, 317.5, 317.7, 304.4; 427/35, 42, 54.1, 44, 43.1, 412.3, 208.4, 208.8

[56] References Cited

U.S. PATENT DOCUMENTS

| Re. 24,906 | 12/1960 | Ulrich | 206/59 |
|---|---|---|---|
| 2,925,174 | 2/1960 | Stow | 206/59 |
| 2,956,904 | 10/1960 | Hendricks | 117/93 |
| 2,973,286 | 2/1961 | Ulrich | 117/122 |
| 3,252,880 | 5/1966 | Magat et al. | 204/154 |
| 3,387,991 | 6/1968 | Erchak, Jr. | |
| 3,661,618 | 5/1972 | Brookman et al. | |
| 4,148,839 | 4/1979 | Fydelor | 260/857 |
| 4,179,401 | 12/1979 | Garnett et al. | 252/429 |
| 4,181,752 | 1/1980 | Martens et al. | 427/54.1 |
| 4,196,254 | 4/1980 | Puskadi | 428/341 |
| 4,216,257 | 8/1980 | Schams et al. | 428/93 |
| 4,223,067 | 9/1980 | Levens | 428/308 |
| 4,290,174 | 9/1981 | Kalleberg | 24/204 |
| 4,290,832 | 9/1981 | Kalleberg | 156/72 |
| 4,329,384 | 5/1982 | Vesley et al. | 428/40 |
| 4,401,192 | 8/1983 | Heger et al. | 427/43 |
| 4,455,331 | 6/1984 | Barsotti | 524/492 |

FOREIGN PATENT DOCUMENTS

| 836749 | 4/1976 | Belgium . |
| 2031706 | 6/1970 | Fed. Rep. of Germany . |
| 2025433A | 5/1979 | United Kingdom . |

OTHER PUBLICATIONS

Shinzo Yamakawa and Fumio Yamamoto, "Surface Modification of Polyethylene by Radiation-Induced Grafting for Adhesive Bonding", *Journal of Applied Polymer Science*, vol. 25, 31–49 (1980).

S. Shkolnik and D. Behar, "Radiation-Induced Grafting of Sulfonates on Polyethylene", *Journal of Applied Polymer Science*, vol. 27, 2189–2196 (1982).

*Primary Examiner*—Edith Buffalow
*Attorney, Agent, or Firm*—Donald M. Sell; James A. Smith; Carole Truesdale

[57] ABSTRACT

Acrylic-type normally tacky and pressure-sensitive adhesives are firmly bonded to polyolefin substrates that have been primed by coating with a monomer composition and subjecting the coated substrate to actinic radiation to effect graft-polymerization.

11 Claims, No Drawings

POLYOLEFIN SUBSTRATE COATED WITH ACRYLIC-TYPE NORMALLY TACKY AND PRESSURE-SENSITIVE ADHESIVE AND A METHOD OF MAKING SAME

CROSS-REFERENCE TO RELATED APPLICATION

This application is a continuation-in-part of Applicants' copending application Ser. No. 479,517, filed Mar. 28, 1983 abandoned.

TECHNICAL FIELD

This invention relates to normally tacky and pressure-sensitive adhesive-coated substrates, especially to pressure-sensitive adhesive-coated polyolefin sheet material. The invention also relates to a method of making such products.

BACKGROUND ART

For many years there has existed a desire for pressure-sensitive adhesive-coated polyolefin products (e.g., polyethylene, polypropylene or polyallomer, which is an ethylene:propylene copolymer) in which the pressure-sensitive adhesive is firmly bonded to the polyolefin and remains so at elevated temperatures, e.g., 120° C. Although it is comparatively easy to bond rubber-resin type pressure-sensitive adhesives to polyolefin substrates, the adhesive bond tends to weaken and the product to be subject to failure at temperatures of about 65° C. or higher. Although acrylic-type pressure-sensitive adhesives have superior heat resistance, they do not normally bond effectively to polyolefin substrates; indeed polyolefin films are sometimes used as release liners for these adhesives.

Untreated polyethylene and other polyolefins are poor substrates for acrylic adhesives, and a large amount of effort has gone into the search for a technique which will easily and reliably increase adhesion without significant changes in bulk properties. The most extensively studied techniques for enhancing adhesive bonding are treatment with helium gas plasma, oxygen gas plasma, or chromic acid. These and other surface modification procedures suffer from a common shortcoming in the poor durability of the treatment. Light rubbing of the surface causes a decrease in the effect, the altered surface being easily abraded. A more durable treatment would be the application to the polyolefin surface of a thin coating of material which is itself a good substrate for the adhesive. Then, however, the weak link becomes the interface between the polyolefin surface and the coating.

A particular application for polyolefin-backed pressure-sensitive adhesive coated products in which higher temperature resistance is desired is shown in Schams et al U.S. Pat. No. 4,216,257 and Kalleberg U.S. Pat. No. 4,290,174, which describe fasteners comprising two articles adapted for releasable engagement. At least one of the articles comprises a backing with a non-fibrous polyolefin surface bonding layer in which are embedded a plurality of U-shaped flexible resilient monofilaments of longitudinally oriented polymeric material. Each of the monofilaments includes two stem portions projecting from the surface bonding layer and terminating in enlarged heads having outer cam surfaces adapted to engage the other article. The manufacture of this product is described in Kalleberg U.S. Pat. No. 4,290,832; the disclosures of these three patents are incorporated herein by reference.

Fasteners of the type described in the aforementioned patents are particularly useful in attaching the covers to automobile seats. Automobile interiors, however, are often subjected to extremely high temperatures (e.g., 100°–120° C. or even higher), especially when a closed automobile remains in the sun for extended periods of time. The rubber-resin type normally tacky and pressure-sensitive adhesives referred to in the aforementioned Schams et al and Kalleberg patents are incapable of functioning effectively in such environments. It has been recognized that acrylic-type normally tacky and pressure-sensitive adhesives, such as disclosed in Ulrich U.S. Pat. No. Re. 24,906, are capable of enduring higher temperatures, and acrylic-type adhesives prepared in accordance with the teaching of Martens et al U.S. Pat. No. 4,181,752 are capable of maintaining their strength at perhaps even higher levels. Additional strength can be imparted to acrylic-type normally tacky and pressure-sensitive adhesives by crosslinking, e.g., as shown in the following U.S. Pat. Nos.: Stow 2,925,174, Ulrich 2,973,286, and Hendricks 2,956,904. In some instances, it has been found useful to employ highly conformable acrylic-type pressure-sensitive adhesives that contain uniformly distributed small glass microbubbles, as disclosed in Levens U.S. Pat. No. 4,223,067. Again, in the interest of completeness, the disclosures of these patents are likewise incorporated by reference.

Despite the recognized desirability of using acrylic-type normally tacky and pressure-sensitive adhesive compositions in the structures described above, there did not, prior to the present invention, exist any recognized way of securing adequate adhesion to polyolefin substrates.

SUMMARY

The present invention provides a normally tacky and pressure-sensitive adhesive-coated product in which the substrate is a polyolefin material and, firmly bonded over the surface of the polyolefin substrate, is an acrylic-type normally tacky and pressure-sensitive adhesive. The adhesive is firmly bonded, and remains so even at temperatures as high as 180° C., or even higher.

In accordance with the invention there is provided a normally tacky and pressure-sensitive adhesive-coated product comprising:
(a) a polyolefin substrate,
(b) graft-polymerized to at least a portion of said substrate at least one monomer selected from the group consisting of acrylic acid, methacrylic acid and esters thereof; acrylamide; methacrylamide; sterically non-hindered tertiary alkyl acrylamides and methacrylamides; secondary alkyl acrylamides and methacrylamides having three or less carbon atoms in the alkyl group; and N-vinyl pyrrolidone, and
(c) firmly adhesively bonded to the vinyl polymer an acrylic-type normally tacky and pressure-sensitive adhesive.

In another aspect, the present invention provides a method of preparing a normally tacky and pressure-sensitive adhesive-coated article in which an acrylic-type normally tacky and pressure-sensitive adhesive is bonded to a polyolefin substrate so that it adheres firmly, even at elevated temperatures, comprising the steps of:
(a) treating the surface of said substrate to enable a polar liquid to wet said surface, (b) coating over the treated surface a monomer selected from the group consisting of acrylic acid, methacrylic acid and esters thereof; acrylamide; methacrylamide; sterically non-hindered tertiary alkyl acrylamides and methacrylamides; secondary alkyl acrylamides and methacrylamides having three or less carbon atoms in the alkyl group; and N-vinyl pyrrolidone, (c) irradiating the coated substrate to graft polymerize said monomer to said treated substrate, and (d) applying a layer of acrylic-type pressure-sensitive adhesive over the graft-polymerized surface.

At this point, it is noted that the irradiation of polyolefin substrates, such as with an electron beam, to improve the adhesion of various coatings is broadly old; see, e.g., the following U.S. Pat. Nos.: Heger et al 4,041,192, Fydelor 4,148,839, Magat et al 3,252,880, Garnett et al 4,179,401, etc. There also exist numerous journal publications treating this same general subject, e.g., Shinzo Yamakawa and Fumio Yamamoto, "Surface Modification of Polyethylene by Radiation-Induced Grafting for Adhesive Bonding", *Journal of Applied Polymer Science*, Vol. 25, 31–49 (1980) and S. Shkolnik and D. Behar, "Radiation-Induced Grafting of Sulfonates on Polyethylene, *Journal of Applied Polymer Science*, Vol. 27, 2189–2196 (1982). None of these patents or publications, however, discusses the improved bonding of an acrylic-type normally tacky and pressure-sensitive adhesive to a polyolefin substrate.

DETAILED DESCRIPTION

The substrate of the present invention is a polyolefin sheet material, such as polyethylene, polypropylene or polyallomer, which is an ethylene/propylene copolymer. The term "polyolefin" as used herein also includes olefin copolymers, such as an ethylene/acrylic acid copolymer, and ethylene/vinyl acetate copolymer and an ethylene/propylene/cyclopentadiene copolymer. The thickness of the polyolefin sheet material is determined by the end use of the adhesive coated product, typical thicknesses being in the range of about 0.025 to about 5.0 millimeters. The polyolefin sheet material may contain additives, such as carbon black, calcium carbonate, silica, titanium dioxide, crosslinking agents, dispersants and extrusion aids, which are known in the art.

Monomers suitable for graft-polymerization onto the polyolefin substrate to promote adherence of normally tacky pressure-sensitive acrylic type adhesives to the substrate include acrylic acid, methacrylic acid and esters thereof; acrylamide; methacrylamide; sterically non-hindered tertiary alkyl acrylamides and methacrylamides; secondary alkyl acrylamides and methacrylamides having three or less carbon atoms in the alkyl group; and N-vinyl pyrrolidone.

Examples of useful esters of acrylic acid and methacrylic acid include hydroxyethyl methacrylate, isobutyl methacrylate, allyl methacrylate, cyclohexyl methacrylate, iso-decyl methacrylate, hexanediol dimethacrylate, hexanediol diacrylate, n-hexyl methacrylate, β-carboxyethyl acrylate, thiodiethylene glycol diacrylate, glycidyl methacrylate, 2,3-dibromopropyl acrylate, and diethylaminoethyl acrylate. Examples of useful sterically non-hindered tertiary alkyl acrylamides and methacrylamides include N,N-dimethyl acrylamide, N,N-diethyl acrylamide, N,N-dipropyl acrylamide, N-ethyl-N-n-butyl acrylamide, N,N-dimethyl methacrylamide, N,N-diethyl methacrylamide and N,N-dipropyl methacrylamide. The preferred sterically non-hindered tertiary alkyl acrylamides include N,N-dimethyl acrylamide, N,N-diethyl acrylamide and N,N-dipropyl acrylamide. Examples of useful secondary alkyl acrylamides include N-methyl acrylamide, N-ethyl acrylamide, and N-n-propyl acrylamide.

The monomer composition generally contains about 60 to about 100 percent monomer, preferably about 70 to about 90 percent and most preferably about 80 percent monomer, although as low as 20 percent monomer is effective when used with selected crosslinking agents. The monomer composition applied to the polyolefin substrate may contain various additives such as crosslinking agents, surfactants, alcohols, and acids.

Crosslinking agents may be added to further enhance heat resistance of the product. Examples of useful crosslinking agents include polyethylene glycol diacrylate, pentaerythritol tetracrylate, tetraethylene glycol dimethacrylate, trimethylol propane triacrylate, trimethylol propane trimethacrylate, allyl methacrylate, 1,6-hexanediol diacrylate, 1,6-hexanediol dimethacrylate, thiodiethylene glycol diacrylate, and triallyl cyanurate. The preferred crosslinking agents include polyethylene glycol diacrylate, tetraethylene glycol dimethacrylate, trimethylol propane triacrylate, and thiodiethylene glycol diacrylate. Crosslinking agents may be present in monomer compositions in amounts of about 0 to about 80 percent, preferably 10 to 30 percent and most preferably about 20 percent.

Surfactants may be present in the monomer composition to improve the uniformity of the coating on the substrate.

The thickness of the monomer composition is preferably less than about 5 micrometers, more preferably less than about 1 micrometer and most preferably less than about 0.5 micrometer. Indeed, it is believed that thicknesses approaching a single molecular layer would function effectively.

The acrylic-type pressure-sensitive adhesives useful in the present invention are those known normally tacky pressure-sensitive adhesives, such as those disclosed in U.S. Pat. Nos. 4,181,752, Re. 24,906 and 4,329,384. The adhesives may be coated on the graft-polymerized surface from a solventless solution or from a solvent solution followed by solvent evaporation.

In some applications, the acrylic-type pressure-sensitive adhesive is not coated directly over the graft-polymerized polyolefin surface. Instead, the adhesive is coated on the surface of a flexible polyurethane, acrylic or other polymeric foam which is then laminated to the graft-polymerized surface. The opposite surface of the foam may, if desired, also be provided with a layer of normally tacky pressure-sensitive adhesive. Optionally, the foam may be replaced with an open non-woven fibrous web structure. Similarly, a conventional tape comprising, e.g., an aluminum foil backing and having an acrylic-type pressure-sensitive adhesive, may be bonded to the graft-polymerized surface.

For uniform application of the monomer to the polyolefin substrate, the substrate is preferably treated to enable a polar liquid to wet the surface. This can be achieved by treating the substrate with an oxidizing agent, such as nitric acid or chromic acid, or treating the substrate with flame, plasma discharge or corona discharge. The preferred method of treatment is corona discharge.

The monomer may be graft-polymerized to the substrate by use of actinic radiation such as ultraviolet light and visible light and ionizing radiation such as x-rays, beta rays, gamma rays, and electron beam irradiation. The preferred method of graft-polymerization is by irradiation with an electron beam. The electron beam dosage is typically greater than about 0.05 Mrads and preferably greater than about 0.5 Mrads.

The advantages of the invention are illustrated by the following examples, it being understood that numerous variations will be well within the ability of those skilled in the art.

EXAMPLE 1

Into a polyallomer resin, available from Tennessee Eastman under the trade designation "Tenite" 5321E, was milled 1% carbon black by weight. The composition was then extruded as a sheet having a thickness of about 0.5 millimeter, after which one surface was corona treated by passing the sheet through a 32-micrometer air gap between a chlorinated polyethylene-coated electrode and a grounded aluminum cylinder. The frequency of the unit was 16 kHz, the total input power being 1.5 kw and the exposure time of the sample being on the order of 0.6–1.0 sec. Over the corona-treated surface was then applied a blend of 80 parts N,N-dimethyl acrylamide, 20 parts trimethylol propane triacrylate, and 0.5 part of a fluorochemical acrylate oligomer (a wetting and leveling agent commercially available from 3M Company as "FC 430"). The blend, which had a viscosity of 2.3 cps at 25° C., was applied to the corona-treated polyallomer surface using a No. 135 knurled gravure roll in combination with a doctor blade, minimizing the coating thickness to less than one micrometer.

The coated surface was then exposed to electron beam irradiation at a dosage of 1.5–2.5 Mrads and a voltage of 150–250 kV in a nitrogen atmosphere. The dosage was held at a relatively low level to minimize any degradation of the polyallomer. The electron beam irradiation process apparently generated free radicals in the surface of the polyallomer and resulted in the cross-linking and graft-polymerization of the coating. Because the polyallomer contained carbon black, which acts as a free radical trap, it is desirable to apply heat at some subsequent point to cause the free radicals to react with each other or migrate to the carbon black, thereby minimizing any possible oxidative degradation problem. (Such heat is normally applied in the filament implanting process described in the aforementioned Schams et al and Kalleberg patents.) The nitrogen atmosphere was provided to prevent inhibition of the graft-copolymerization by atmospheric oxygen.

The graft-polymerized surface was then coated with a solvent solution of a 90:10 iso-octyl acrylate:acrylic acid copolymer pressure-sensitive adhesive and the solvent evaporated. The adhesive was firmly bonded to the graft-polymerized surface of the polyallomer; when placed in contact with a stainless steel panel for three days at room temperature and removed at an angle of 90° at the rate of 30 cm/min., the force required was approximately 17.6 N/cm. In sharp contrast, the adhesion of this acrylic-type adhesive to an untreated polyolefin surface is so low that the latter functions as a release agent, typically having a removal adhesion force value of about 4 N/cm.

To illustrate other monomer compositions that can be graft-polymerized on a polyolefin surface, a crosslinked polyethylene substrate containing trimethylol propane triacrylate and carbon black was treated with a 60:40 n-butyl acrylate:dimethyl acrylamide blend containing such additives as trimethylol propane triacrylate, nitric acid, n-butyl alcohol, and, to further enhance heat resistance, a thermally activated crosslinking resin such as "Cymel" 303. In each case, very thin layers of the mixtures were coated onto the polyethylene which is immediately electron beam irradiated with 1 to 10 Mrads. After treatment, the homopolymerized material which had not grafted was wiped off using a suitable solvent such as acetone. For convenience in processing, it may be desirable to include additional crosslinker and thereby obviate the need for a wiping step.

Samples of the grafted material were analyzed using frustrated multireflectance infrared (FMIR) spectroscopy. Samples which were grafted with mixtures of N,N-dimethyl acrylamide with dimethylaminoethyl acrylate or iso-decyl acrylate were wiped with acetone and their spectra taken. The 5.75-micrometer band due to the acrylate carbonyls and the 6.1 u band due to the amide carbonyl were quantitatively evaluated. Each sample was then extracted in acetone for a period of 16 hours and the spectra repeated. No change was seen in the intensity of the carbonyl bands, which led to the conclusion that the acrylate and amide functionalities had been covalently attached to the polyethylene surface. Results are tabulated in Table 1 below.

TABLE 1

| Monomers[a] | Monomer Ratio[b] | Relative Coating Weights |
|---|---|---|
| (IOA/AA)/DMA | 0.59 | 7.3 |
| DMA | — | 6.2 |
| DAMA/DMA | 1.61 | 0.80 |
| IDA | — | >2.3 |
| IDA/DMA | 0.4 | >10[c] |
| DAMA | — | 0.77 |
| BA/DMA | 0.5 | 2.0 |

[a]where
IOA = iso-octyl acrylate
AA = acrylic acid
DMA = N,N—dimethyl acrylamide
DAMA = N,N—dimethylaminoethyl methacrylate
IDA = iso-decyl acrylate
BA = n-butyl acrylate
[b]Calculated from ratio of carbonyl band intensities
[c]Virtually no polyethylene was seen. This corresponds to a coating depth of ≧ 0.5 micrometer.

To the various graft-polymerized substrates were laminated aluminum foil-backed tape having an aggressive acrylic type pressure-sensitive adhesive. Shear tests were then run at 180° C. Results are tabulated in Table 2 below:

TABLE 2

| Grafted Monomer* | Shear Strength N/cm | Failure Mode** |
|---|---|---|
| None (control) | 1.6 | |
| DMA | 15.9 | C/A |
| 60/40 IA/DMA | 9.2 | A |
| MAA | 13.8 | A/C |
| DAMA | 11.5 | A/C |
| 80/20 DAMA/MAA | 13.8 | C/A |
| 50/45/5 DMA/IOA/AA | 15.3 | A/C |
| 60/40 BA/DMA | 18.3 | A/C |

*IA = Itaconic Acid
MAA = Methacrylic Acid
**C = Cohesive failure
A = Adhesive failure

EXAMPLES 2–16 AND COMPARATIVE EXAMPLE C-1

In Examples 2–16, a polyallomer sheet was extruded and corona treated as in Example 1. Each of the various monomer blends was then applied over the corona treated surface, each blend comprising 80 parts by weight of the monomer as set forth in Table 3, 20 parts by weight trimethylol propane triacrylate and 0.1 part by weight FC-430. The monomer blend was then exposed to electron beam irradiation at a dosage of 1.5 to 4.0 Mrads and a voltage of 170 kV in a nitrogen atmosphere to effect crosslinking and graft-polymerization of each coating. A pressure-sensitive adhesive tape was prepared by applying a 90:10 iso-octyl acrylate:acrylic acid copolymer pressure-sensitive adhesive to a flexible polyester substrate. The exposed surface of this adhesive was then place in contact with the graft-polymerized substrate and the tape rolled with a 4.5 pound roller. Room temperature 180° angle peel tests were performed using an Imass Model SP-101A slip/peel tester with a peel rate of 6 inches per minute. (ASTM-D 3330). The results are shown in Table 3. For Comparative Example C-1 a peel test was conducted on polyallomer that had been exposed to corona treatment and having no graft-polymerized monomer on the surface. The results of the peel test on this substrate is also set forth in Table 3.

TABLE 3

| Example | Monomer | Peel Force (g/in) |
| --- | --- | --- |
| 2 | hydroxyethyl methacrylate | 1080 |
| 3 | iso-butyl methacrylate | 1060 |
| 4 | allyl methacrylate | 1060 |
| 5 | cyclohexyl methacrylate | 1280 |
| 6 | hexanediol dimethacrylate | 1080 |
| 7 | hexanedioldiacrylate | 1100 |
| 8 | n-hexylmethylacrylate | 1020 |
| 9 | β-carboxyethyl acrylate | 1000 |
| 10 | thiodiethylene glycol diacrylate | 1100 |
| 11 | glycidyl methacrylate | 1200 |
| 12 | 2,3-dibromopropyl acrylate | 1100 |
| 13 | diethylaminoethyl acrylate | 1280 |
| 14 | acrylic acid | 1180 |
| 15 | methacrylic acid | 1160 |
| 16 | N—vinyl pyrrolidone | 1460 |
| C-1 | — | 541 |

EXAMPLES 17–21

Several acrylamide monomers were synthesized by a condensation of various primary and secondary amines with acryloyl chloride. One mole of amine was combined in a two-neck round bottom flask with one mole of triethylamine, which acted to scavenge the HCl that is a by-product of the reaction. Then, one mole of acryloyl chloride was diluted with approximately 300 ml methylene chloride and added dropwise to the stirred amine over a period of about 5 hours. The amine was cooled in an ice bath until the addition of the acryloyl chloride was complete, at which time the reaction mixture was allowed to return to room temperature with continued stirring. The mixture was then filtered to remove precipitated triethylamine hydrochloride and the filtrate was washed with water to remove any remaining salts. Finally, the methylene chloride was removed by evaporation and the product was purified by vacuum distillation. The identity of the products was verified using NMR spectroscopy. A list of the monomers along with their respective boiling points is set forth in Table 4.

TABLE 4

| Monomer | Boiling Point |
| --- | --- |
| N,N—diethyl acrylamide | 57° C./0.1 Torr |

TABLE 4-continued

| Monomer | Boiling Point |
| --- | --- |
| N,N—dipropyl acrylamide | 130° C./7 Torr |
| N—ethyl-N—n-butyl acrylamide | 130° C./6 Torr |
| N—n-propyl acrylamide | 137° C./8 Torr |

These monoalkyl and dialkyl acrylamides were each blended with trimethylol propane triacrylate, coated on corona treated polyallomer and then the coated polyallomer was irradiated as in Examples 2–16. Adhesive was applied to each graft-polymerized surface and tested for peel strength as in Examples 2–16. The results are set forth in Table 5 below.

TABLE 5

| Example | Monomer | Peel Force (g/in) |
| --- | --- | --- |
| 17 | N,N—dimethyl acrylamide | 1417 |
| 18 | N,N—diethyl acrylamide | 1252 |
| 19 | N,N—dipropyl acrylamide | 1107 |
| 20 | N—ethyl-N—n-butyl acrylamide | 1063 |
| 21 | N—n-propyl acrylamide | 693 |

EXAMPLES 22–26 AND COMPARATIVE EXAMPLES C-2 AND C-3

Graft-polymerized polyallomer surfaces were prepared as in Examples 17–21. An aggressive acrylic-type pressure-sensitive adhesive test tape was prepared by coating a 90:10 iso-octyl acrylate:acrylic acid copolymer pressure-sensitive adhesive onto aluminum foil. One-inch strips of the test tape were laminated to the graft-polymerized surface of the polyallomer and T-peel tests were performed at a peel rate of 12 inches per minute. In Comparative Examples C-2 and C-3, the aluminum foil-backed tape having an aggressive acrylic-type pressure-sensitive adhesive was laminated to polyallomer with and without corona treatment. The results are shown in Table 6.

TABLE 6

| Example | Monomer | Peel Force (g/in) |
| --- | --- | --- |
| 22 | N,N—dimethyl acrylamide | 2270 |
| 23 | N,N—diethyl acrylamide | 2400 |
| 24 | N,N—dipropyl acrylamide | 2200 |
| 25 | N—ethyl-N—n-butyl acrylamide | 2180 |
| 26 | N—n-propyl acrylamide | 2040 |
| C-2* | — | 1320 |
| C-3** | — | 1590 |

*polyallomer without corona treatment
**polyallomer with corona treatment

EXAMPLES 27–31 AND COMPARATIVE EXAMPLES C-4 AND C-5

Into a polyethylene was milled twenty percent carbon black by weight. The composition was then extruded as a sheet having a thickness of about 2.3 millimeter, after which one surface was corona-treated by passing the sheet through a 32-micrometer air gap between a chlorinated polyethylene-coated electrode and a grounded aluminum cylinder. The frequency of the unit was 16 kHz, the total input power being 1.5 kw and the exposure time of the sample being on the order of 0.6–1.0 second. The monomers set forth in Table 7 were formulated as follows: 80 parts by weight monomer, 10 parts by weight "Cymel" 303, 5 parts by weight trimethylol propane trimethacrylate, 5.0 parts by weight n-butanol, 0.1 part by weight FC-430 surfactant, and 0.1 part by weight nitric acid. Each formulation was then coated on the corona treated polyethylene. The coated surface was then exposed to electron beam irradiation at a dose of 5 Mrads and a voltage of 200 kV in a nitrogen atmosphere. An adhesive was applied to the graft-polymerized surface and 180° angle peel tests conducted as in Examples 2-16. Comparative Examples C-4 and C-5 were prepared by conducting the 180° angle peel test on polyethylene with and without corona treatment. The results are tabulated in Table 7 below.

TABLE 7

| Example | Monomer | Peel Force (g/in) |
|---|---|---|
| 27 | N,N—dimethyl acrylamide | 1413 |
| 28 | N,N—diethyl acrylamide | 1261 |
| 29 | N,N—dipropyl acrylamide | 1631 |
| 30 | N—ethyl-N—n-butyl acrylamide | 1311 |
| 31 | N—n-propyl acrylamide | 905 |
| C-4* | — | 771 |
| C-5** | — | 810 |

*polyethylene without corona treatment
**polyethylene with corona treatment

EXAMPLES 32-36 AND COMPARATIVE EXAMPLES C-6 AND C-7

Graft-polymerized substrates were prepared as in Examples 27-31. To the various graft-polymerized substrates were laminated aluminum foil-backed tape having an aggressive acrylic type pressure-sensitive adhesive. In Comparative Examples C-6 and C-7, the aluminum foil-backed tape having the aggressive acrylic type pressure-sensitive adhesive was laminated to polyethylene with and without corona treatment. Shear tests were then run at 180° C. and room temperature. The results are tabulated in Table 8 below.

TABLE 8

| | | Shear Force | |
|---|---|---|---|
| Example | Monomer | Room Temp (PSI) | 180° C. (PSI) |
| 32 | N,N—dimethyl acrylamide | 268 | 22.0 |
| 33 | N,N—diethyl acrylamide | 280 | 20.0 |
| 34 | N,N—dipropyl acrylamide | 270 | 22.0 |
| 35 | N—ethyl-N—n-butyl acrylamide | 272 | 16.6 |
| 36 | N—n-propyl acrylamide | 268 | 15.0 |
| C-6* | — | 6 | 5.4 |
| C-7** | — | 12 | 10.8 |

*polyethylene without corona treatment
**polyethylene with corona treatment

EXAMPLES 37-42

Polyethylene sheet material was extruded and corona treated as in Examples 27-31. Monomer formulations were prepared using the monomers set forth in Table 9 and trimethylol propane triacrylate (TMPTA) as the crosslinking agent in the proportions shown in Table 9. Each formulation was then coated on the corona treated polyethylene sheet material. The coated surface was then exposed to electron beam irradiation at a dose of 10 Mrads and a voltage of 200 kV in a nitrogen atmosphere to graft-polymerize the monomer coating. The pressure-sensitive adhesive tape was adhered to the graft-polymerized surface and 180° angle peel tests conducted as in Examples 2-16. The results of the peel tests are set forth in Table 9.

TABLE 9

| Example | Monomer | Parts by Wt. Monomer | Parts by Wt. TMPTA | Peel Force (g/in) |
|---|---|---|---|---|
| 37 | N,N—diethyl methacrylamide | 60 | 40 | 607 |
| 38 | N,N—diethyl methacrylamide | 40 | 60 | 940 |
| 39 | N,N—diethyl methacrylamide | 20 | 80 | 1195 |
| 40 | N,N—dipropyl methacrylamide | 60 | 40 | 591 |
| 41 | N,N—dipropyl methacrylamide | 40 | 60 | 658 |
| 42 | N,N—dipropyl methacrylamide | 20 | 80 | 967 |

EXAMPLES 43-48

Polyallomer sheet material was extruded and corona treated as in Example 1. Monomer formulations were prepared, coated on the polyallomer sheet material and graft polymerized as in Examples 37-41. A pressure-sensitive adhesive tape was adhered to the graft-polymerized surface and 180° angle peel tests were conducted as in Examples 2-16. The formulation proportions and the results of the peel tests are set forth in Table 10.

TABLE 10

| Example | Monomer | Parts by Wt. Monomer | Parts by Wt. TMPTA | Peel Force (g/in) |
|---|---|---|---|---|
| 43 | N,N—diethyl methacrylamide | 60 | 40 | 1063 |
| 44 | N,N—diethyl methacrylamide | 40 | 60 | 1355 |
| 45 | N,N—diethyl methacrylamide | 20 | 80 | 1456 |
| 46 | N,N—dipropyl methacrylamide | 60 | 40 | 1133 |
| 47 | N,N—dipropyl methacrylamide | 40 | 60 | 1312 |
| 48 | N,N—dipropyl methacrylamide | 20 | 80 | 1424 |

EXAMPLES 49-50

Polyethylene sheet material was extruded and corona treated as in Examples 27-31. In Example 49, a 33% solution of acrylamide in acetone was coated on the corona treated polyethylene sheet material. In Example 50, an acetone solution containing 31.5% acrylamide and 1.5% trimethylol propane triacrylate was coated on the corona treated polyethylene sheet material. Each coated sheet was exposed to electron beam irradiation at a dose of 5 Mrads and a voltage of 200 kV in a nitrogen atmosphere to graft-polymerize the monomer coating. A pressure-sensitive adhesive tape was adhered to the graft-polymerized surface at 180° angle peel tests conducted as in Examples 2-16. The results of the peel tests are set forth in Table 11.

TABLE 11

| Example | Peel Force (g/in) |
|---|---|
| 49 | 1173 |
| 50 | 1107 |

EXAMPLES 51-52

Polyethylene containing no carbon black filler was extruded as a sheet having a thickness of 0.25 millimeter, after which one surface was corona treated as in Example 1.

In Example 51, a 33% solution of acrylamide in acetone was coated on the corona treated polyethylene sheet material. In Example 52, an acetone solution containing 31.5% acrylamide and 1.5% trimethylol propane triacrylate was coated on the corona treated polyethylene sheet material. Each coated sheet was exposed to electron beam irradiation at a dose of 5 Mrads and a voltage of 200 kV in a nitrogen atmosphere to graft-polymerize the monomer coating. A pressure-sensitive adhesive tape was adhered to the graft-polymerized surface and 180° angle peel tests conducted as in Examples 2–16. The results of the peel tests are set forth in Table 12.

TABLE 12

| Example | Peel Force (g/in) |
|---------|-------------------|
| 51      | 920               |
| 52      | 1060              |

What is claimed is:

1. A normally tacky and pressure-sensitive adhesive-coated product comprising:
   (a) a polyolefin substrate,
   (b) A monomer composition graft-polymerized to at least a portion of said substrate by ionizing radiation, said monomer composition having at least one monomer selected from the group consisting of acrylic acid, methacrylic acid and esters thereof; acrylamide; methacrylamide; sterically non-hindered tertiary alkyl acrylamides and methacrylamides; secondary alkyl acrylamides and methacrylamides having three or less carbon atoms in the alkyl group; and N-vinyl pyrrolidone, and
   (c) firmly adherently bonded to the graft-polymerized monomer an acrylic type normally tacky and pressure-sensitive adhesive.

2. The product of claim 1 wherein the polyolefin substrate is a layer of polyallomer.

3. The product of claim 1 wherein the esters of acrylic acid and methacrylic acid are selected from hydroxyethyl methacrylate, iso-butyl methacrylate, allyl methacrylate, cyclohexyl methacrylate, iso-decyl methacrylate, hexanediol dimethacrylate, hexanediol diacrylate, n-hexyl methacrylate, β-carboxyethyl acrylate, thiodiethylene glycol diacrylate, glycidyl methacrylate, 2,3-dibromopropyl acrylate, and diethylaminoethyl acrylate.

4. The product of claim 1 wherein the sterically non-hindered tertiary alkyl acrylamides are selected from N,N-dimethyl acrylamide, N,N-diethyl acrylamide, N,N-dipropyl acrylamide, N-ethyl-N-n-butyl acrylamide, N,N-dimethyl methacrylamide, N,N-diethyl methacrylamide, and N,N-dipropyl methacrylamide.

5. The product of claim 1 wherein the secondary alkyl acrylamides are selected from N-methyl acrylamide, N-ethyl acrylamide, and N-n-propyl acrylamide.

6. The product of claim 1 wherein the monomer composition further comprises a minor effective amount of a crosslinking agent.

7. The product of claim 6 wherein the crosslinking agent is selected from polyethylene glycol diacrylate, pentaerythritol tetracrylate, tetraethylene glycol dimethacrylate, trimethylol propane triacrylate, trimethylol propane trimethacrylate, allyl methacrylate, 1,6-hexanediol diacrylate, 1,6-hexanediol dimethacrylate, thiodiethylene glycol diacrylate, and triallyl cyanurate.

8. The product of claim 1 wherein the acrylic type adhesive is an iso-octyl acrylate:acrylic acid copolymer.

9. The product of claim 1 wherein a stratum of foam is bonded to the exposed surface of the acrylic adhesive.

10. The product of claim 9 wherein a second layer of normally tacky and pressure-sensitive adhesive is bonded to the exposed surface of the foam.

11. A normally tacky, pressure-sensitive adhesive-coated polyolefin substrate, having adhesive firmly adhered to said substrate, even at elevated temperatures, prepared according to a process comprising the steps of:
   (a) treating the surface of said substrate to enable a polar liquid to wet said surface,
   (b) coating on said substrate a monomer composition containing a monomer selected from the group consisting of acrylic acid, methacrylic acid and esters thereof; acrylamide; methacrylamide; sterically non-hindered tertiary alkyl acrylamides and methacrylamides; secondary alkyl acrylamides and methacrylamides having three or less carbon atoms in the alkyl group; and N-vinyl pyrrolidone,
   (c) irradiating the coated substrate with ionizing radiation to graft-polymerize said monomer to the treated substrate, and
   (d) applying a layer of acrylic-type pressure-sensitive adhesive over the graft-polymerized surface.

* * * * *